(12) United States Patent
Robertson et al.

(10) Patent No.: US 11,138,140 B2
(45) Date of Patent: Oct. 5, 2021

(54) CONFIGURING FIRST SUBSYSTEM WITH A MASTER PROCESSOR AND A SECOND SUBSYSTEM WITH A SLAVE PROCESSOR

(71) Applicant: HEWLETT PACKARD ENTERPRISE DEVELOPMENT LP, Houston, TX (US)

(72) Inventors: Naysen Robertson, Roseville, CA (US); Kenneth T. Chin, Houston, TX (US); Theodore F. Emerson, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/779,184

(22) Filed: Jan. 31, 2020

(65) Prior Publication Data
US 2021/0240646 A1 Aug. 5, 2021

(51) Int. Cl.
*G06F 13/362* (2006.01)
*G06F 13/28* (2006.01)
*G06F 13/16* (2006.01)
*G06F 9/54* (2006.01)
*G06F 9/445* (2018.01)
*G06F 9/38* (2018.01)
*G06F 9/4401* (2018.01)

(52) U.S. Cl.
CPC .......... *G06F 13/362* (2013.01); *G06F 9/3877* (2013.01); *G06F 9/4406* (2013.01); *G06F 9/44505* (2013.01); *G06F 9/542* (2013.01); *G06F 9/546* (2013.01); *G06F 13/1652* (2013.01); *G06F 13/287* (2013.01)

(58) Field of Classification Search
CPC .. G06F 13/362; G06F 13/287; G06F 13/1652; G06F 9/44505; G06F 9/3877; G06F 9/546
See application file for complete search history.

(56) References Cited

U.S. PATENT DOCUMENTS

| 6,711,643 | B2 | 3/2004 | Park et al. |
| 6,907,454 | B1* | 6/2005 | Butterworth ............ G06F 15/16 709/208 |
| 7,092,980 | B1 | 8/2006 | Mar et al. |
| 7,111,160 | B1 | 9/2006 | Henniger et al. |
| 7,788,416 | B2 | 8/2010 | Goff |
| 9,448,964 | B2 | 9/2016 | Sullam et al. |

(Continued)

OTHER PUBLICATIONS

Gabrie et al., "Dynamic Reconfiguration of System-on-Chip Devices", 26th International Spring Seminar on Electronics Technology, May 8-11, 2003, pp. 154-157.

(Continued)

*Primary Examiner* — Raymond N Phan
(74) *Attorney, Agent, or Firm* — Hewlett Packard Enterprise Patent Department

(57) ABSTRACT

An apparatus includes a plurality of subsystems, including a first subsystem and a second subsystem. The apparatus includes a master processor to, in response to a power on of the apparatus, execute first instructions to configure the first subsystem and provide second instructions. The apparatus further includes a slave processor to, prior to the boot of the apparatus, receive the second instructions from the master processor and execute the second instructions to configure the second subsystem.

18 Claims, 12 Drawing Sheets

(56) References Cited

U.S. PATENT DOCUMENTS

| | | | |
|---|---|---|---|
| 10,114,550 B2 | 10/2018 | Ryu et al. | |
| 2002/0138225 A1 | 9/2002 | Wong et al. | |
| 2005/0102573 A1 | 5/2005 | Sun et al. | |
| 2006/0225074 A1* | 10/2006 | Vaid | G06F 9/522 |
| | | | 718/102 |
| 2007/0139074 A1 | 6/2007 | Reblewski | |
| 2008/0120486 A1* | 5/2008 | Ritz | G06F 11/203 |
| | | | 711/173 |
| 2010/0088703 A1* | 4/2010 | Whitfield | G06F 9/5027 |
| | | | 718/101 |
| 2010/0293313 A1* | 11/2010 | Ferringer | G06N 3/086 |
| | | | 710/110 |
| 2012/0324246 A1* | 12/2012 | Rahardjo | G06F 1/26 |
| | | | 713/300 |
| 2014/0095829 A1* | 4/2014 | Mo | G06F 8/00 |
| | | | 712/31 |
| 2015/0178095 A1* | 6/2015 | Balakrishnan | G06F 9/4411 |
| | | | 710/110 |
| 2016/0259950 A1* | 9/2016 | Rittman | G06F 21/74 |
| 2016/0266836 A1* | 9/2016 | Tran | G06F 11/1004 |
| 2019/0001904 A1* | 1/2019 | Sugimoto | G05B 19/0423 |
| 2019/0113568 A1* | 4/2019 | Bowling | G01R 31/3177 |
| 2020/0210362 A1* | 7/2020 | Nishimura | G05B 19/05 |

OTHER PUBLICATIONS

Jürgen Becker, "Configurable Systems-on-Chip (CSoC)", Proceedings of the 15th Symposium on Integrated Circuits and Systems Design (SBCCI'02), IEEE, 2002, 6 pages.

* cited by examiner

CONFIGURING FIRST SUBSYSTEM WITH A MASTER PROCESSOR AND A SECOND SUBSYSTEM WITH A SLAVE PROCESSOR

BACKGROUND

An application specific integrated circuit (ASIC) is an integrated circuit (IC) that is designed for a specific use. For purposes of reducing circuit board area, an embedded processing subsystem, such as a subsystem that includes a System on Chip (SoC), baseboard management controller (BMC) or multiple function microprocessor, may include one or multiple ASICs. In general, an ASIC may be generally "hardened" and be challenging to change once fabricated. The monetary and human resource costs to spin (i.e., rebuild, including redesign and refabricate) a new or modified ASIC may be significant.

DETAILED DESCRIPTION

Figure 1:
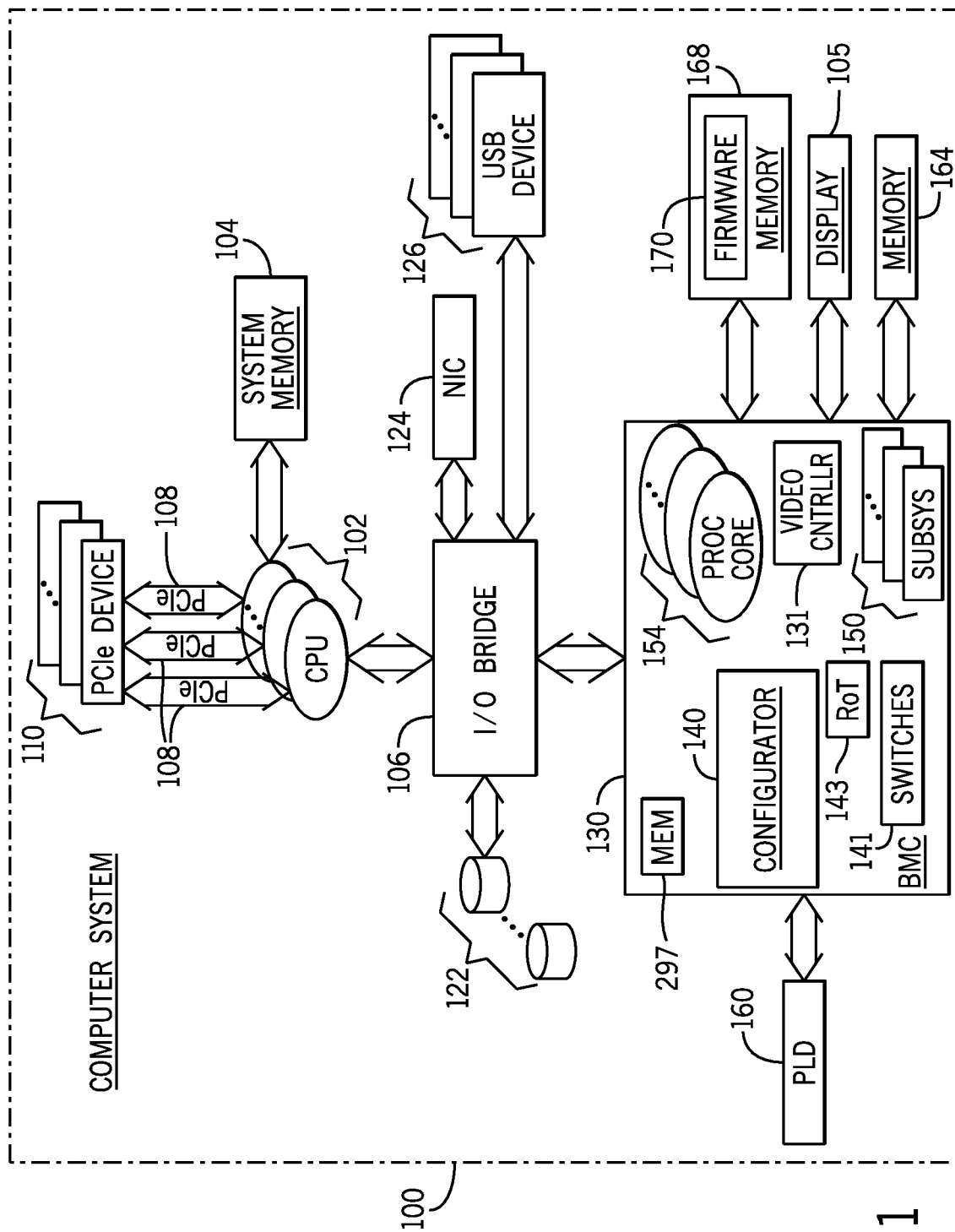
FIG. 1 is a schematic diagram of a computer system according to an example implementation.

A given application specific integrated circuit (ASIC) may be used in different versions of a product, and each of these versions presents a different environment for the ASIC. For various reasons (e.g., monetary costs, human resource costs and product design times), it may be advantageous to modify the ASIC for a particular environment without an ASIC spin (i.e., without another round trip through a design, engineering and fabrication cycle).

As a more specific example, the ASIC may be a baseboard management controller that may be used in a number of computer system environments, such as the environments corresponding to a number of different server models that incorporate the baseboard management controller. The baseboard management controller may contain various components that interact with the environment outside of the baseboard management controller. For example, a memory controller and a physical memory interface of the baseboard management controller, allow the baseboard management controller to access (e.g., read from and write to) external memory devices that are connected to the baseboard management controller. The memory controller and memory interface may have a relatively large number of settings that depend on the specific characteristic of the external memory devices. For example, the settings for the memory interface may depend on whether the external memory devices are double data rate 3 (DDR3) or a DDR4 devices; the error correction code (ECC) used; a dynamic random access memory (DRAM) type of the memory; a memory latency; termination strength; and so forth. Moreover, in addition to interfacing with different components and accommodating the characteristics of these components, the settings of the memory interface may change for different environments due to other reasons. For example, a different physical package placement between the baseboard management controller and the connected memory devices may result in different settings for the memory interface.

One approach to allow custom configuration of an ASIC is for a microcontroller or processor of the ASIC to execute firmware instructions that set various parameters of the ASIC's subsystems. For example, a baseboard management controller may contain one or multiple general purpose processing cores (e.g., Advanced RISC Machine (ARM) processing cores), which execute firmware for the baseboard management controller. The firmware may be modified for a particular computer system environment, so that the modified firmware is tailored to configure the subsystems of the baseboard management controller for that particular environment. However, using such firmware modifications may encounter certain challenges. For example, the firmware executed by the baseboard management controller typically is relatively complex, and modifying the firmware for each computer system environment may introduce risks, introduce additional burdens and increase the time for incorporating the baseboard management controller into the product Using the general purpose processing core(s) to configure subsystems of the baseboard management controller may expose the computer system to security-related issues. For example, if firmware is relied on for the initialization of the memory controller or memory interface of the baseboard management controller, releasing the general purpose processing core(s) from reset to execute the firmware prior to memory initialization may impose security concerns and may not allow the memory to be relied on for particular functions.

Moreover, at power up, the baseboard management controller may encounter an issue (a root-of-trust-related cryptographic fail, a hardware fault, and so forth) that prevents the general purpose processing cores from being released from reset. If this occurs, the baseboard management controller's subsystems are not configured by the firmware, which may result in the ability to report the issue. For example, the baseboard management controller may contain a video controller that accesses video memory that is connected to the baseboard management controller. The video controller may be accessed by a central processing unit (CPU) of the computer system. Although the CPU of the computer system may detect that the baseboard management controller has malfunctioned, if the memory interface of the baseboard controller has not been configured (due to the general purpose processing core(s) of the baseboard management controller not being released from reset), the CPU cannot access the video memory to report error messages.

In accordance with example implementations, an embedded processing system (e.g., a baseboard management controller, a System on a Chip (SoC), and so forth) may contain a configurator and one or multiple general purpose processing cores. The configurator, upon power up, autonomously configures one or multiple subsystems of the embedded processing system while the general purpose processing core(s) remain in reset. In this context, an "embedded processing system" refers to a processor-based system that contains one or multiple general purpose processing cores and performs one of more dedicated functions in a larger system, such as a computer system (e.g., a desktop, a laptop, a server, and so forth). In accordance with some implementations, the embedded processing system may contain one or multiple semiconductor packages (or "chips"), and the semiconductor package(s) may contain one or multiple semiconductor die. Moreover, in the context of this application, the configurator acting "autonomously" refers to the configurator operating separately or independently from any of the general purpose processing core(s) of the embedded processing system.

In accordance with example implementations, the configurator includes a master processor that configures a particular subsystem of the embedded processing system, and the configurator includes one or multiple slave processors that configure one or multiple other subsystems of the embedded processing system. For example, in accordance with some implementations, the master processor may configure a memory controller of the embedded processing system, and a particular slave processor may configure a physical memory interface of the embedded processing system.

The master and slave processors may be associated with different bus communication protocols, so that, for example, the master processor may communicate using one particular bus protocol (e.g., an Advanced High-performance Bus (AHB) protocol) to configure a memory controller of the embedded processing system, whereas, a particular slave processor may communicate over another bus protocol (e.g., an Advanced Peripheral Bus (APB) protocol) to configure a physical memory interface of the embedded processing system.

As used herein, a "subsystem" refers to a particular part of the embedded processing system that performs a particular function for the embedded function, such as, for example, a memory controller, a physical memory interface, a video or display controller, a voltage regulation subsystem, a high speed serial interface (e.g., a Peripheral Component Interconnect Express (PCIe) interface, an Ethernet interface, a Serial Attached SCSI (SAS) interface, a Serial AT Attachment (SATA) interface, or a Universal Serial Bus (USB) 3 interface), and so forth. In general, as described herein, the configurator configures the subsystems of the embedded processing system for the specific computer system environment in which the embedded processing system is used.

In accordance with example implementations, the master processor may contain a master processing core (e.g., an embedded microcontroller), which executes machine executable instructions that are stored in a non-volatile memory (e.g., a read only memory (ROM)) of the master processor. In this context, an "instruction" refers to a group of bits that are processed, or executed, by a processor (e.g., a processing core) to cause the processor to perform a function. The instruction contains a command, which represents the function or action to be performed and one or multiple operands, which represents one or multiple entities (e.g., addresses, data, masks) that are operated on to perform the function or action. Moreover, as described herein, the instruction operand may also contain an embedded command for a slave processor.

The non-volatile memory of the master processor may store groups of instructions, where the groups may correspond to different potential configurations of the subsystem that is configured by the master processor. For example, one group of instructions may, for example, correspond to setting one or multiple configuration and status registers (CSRs) of a memory interface of the embedded processing system for one version of a server containing the embedded processing system, and another group of instructions may correspond to setting the CSRs for another version of a server that contains the embedded processing system.

The non-volatile memory of the master processor may also store case instructions, where the execution of a particular case instruction directs the master processing core's selection of a particular group of instructions to execute, based on a bit vector of data that is provided to the embedded processing system. In this manner, as further described herein, in accordance with some implementations, a component that is external to the embedded processing system, such as a programable logic device (PLD), may store data that represents a bit vector of data, and the PLD furnishes the bit vector of data to the embedded processing system upon power on reset of the embedded processing system. As described further herein, in accordance with example implementations, the case instruction identifies specific bit positions of the bit vector of data, and the bits corresponding to the identified bits select a particular group of instructions (following the case instruction) that are to be executed.

In accordance with example implementations, the master processing core may execute an instruction that contains operands, which collectively represent an instruction for a particular slave processor. More specifically, in accordance with some implementations, the master processor may be connected to the slave processors via an instruction bus; and the instruction bus may contain decode signals that are used to select various slave processors. More specifically, a particular instruction that is executed by the master processing core may contain operands that set forth an embedded instruction to be executed by a specific slave processor, and the master processing core may furnish the embedded instruction to the instruction bus and assert the appropriate decode signal so that the slave processor may retrieve the instruction from the instruction bus and thereafter execute the instruction.

In accordance with some implementations, the slave processor may include a slave processing core (e.g., an embedded microcontroller), as well as a memory (e.g., a non-volatile memory) that stores instructions for execution by the slave processor. In accordance with some implementations, the slave processor may execute instructions that are forwarded to the slave processor via the instruction bus.

Referring to FIG. 1, as a more specific example, in accordance with some implementations, an electronic system may include an embedded processing system that includes a configurator 140 for purposes of initializing, or configuring, one or multiple subsystems 150 of the embedded processing system. For the example implementation that is depicted in FIG. 1, the electronic system is a computer system 100, such as a server, a client, a desktop computer, a laptop computer, a tablet computer, a smartphone, a wearable computer, a rack mounted module, and so forth. For the example implementation that is depicted in FIG. 1, the embedded processing system is a baseboard management controller 130, although the embedded processing system may be any of number of other embedded processing systems, in accordance with further implementations, such as an ASIC other that a baseboard management controller, a SoC, a microprocessor, a microcontroller, and so forth.

As used herein, a "baseboard management controller" is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with example implementations, the computer system 100 includes one or multiple central processing units (CPUs) 102 (e.g., CPU processing cores, semiconductor containing CPU processor cores), and memory devices that connected to the CPU(s) to form a system memory 104 The CPU(s) 102 may be coupled to an input/output (I/O) bridge 106. Moreover, as also depicted in FIG. 1, the computer system 100 may include one or multiple Peripheral Component Interconnect Express (PCIe) devices 110 (e.g., PCIe expansion cards) that may be coupled to the CPU(s) 102 through corresponding individual PCIe bus(es) 108. In accordance with a further example implementation, the PCIe device(s) 110 may be coupled to the I/O bridge 106, instead of being coupled to the CPU(s) 102.

In general, the memory devices that form the system memory 104, as well as other memory devices that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In general, the I/O bridge 106 may connect the CPU(s) 102 to the baseboard management controller 130, one or multiple storage devices 122, one or multiple network interface controllers (NICs) 124 one or multiple universal serial bus (USB) devices 126, and so forth.

In general, the baseboard management controller 130 contains general purpose processing core(s) 154 (e.g., ARM processing cores), which the baseboard management controller 130 holds in reset upon power on reset. After performing initial root of trust security checks as well as other checks (e.g., hardware fault checks), the baseboard management controller 130 releases the general purpose processing core(s) 154 from reset. More specifically, in accordance with example implementations, the baseboard management controller 130 is coupled to an external non-volatile memory 168 that stores firmware 170 that is validated by the baseboard management controller 130 and executed by a CPU 102 to boot the computer system 100. In accordance with example implementations, the baseboard management controller 130 contains a hardware root of trust (RoT) engine 143. In accordance with example implementations, the RoT engine 143 stores an immutable fingerprint, which is used to validate machine executable instructions. More specifically, in response to the baseboard management controller 130 being booted, the RoT engine 143 loads a portion of the firmware 170 and places the portion of the firmware into a memory 297 of the baseboard management controller 130, secures the memory 297, validates the portion of the firmware 170 (using the immutable fingerprint), and locks the contents of the memory 297 so the contents cannot be altered. When the general purpose processing core(s) 154 are taken out of reset, the core(s) 154 fetch the instructions in the secure memory 297 (which has been validated and locked from future modifications). The firmware instructions in the memory 297 are executed by the general purpose processing core(s) to validate the next portion of the firmware 170 which may be executed from memory 168 or, upon finishing the execution of patch instructions (described further herein), may be copied and executed from a volatile memory 164 (e.g., a memory formed from Double Data Rate (DDR) 4 DRAM devices) that is external to the baseboard management controller 130. In accordance with example implementations, the validation of components of the computer system 100 may be performed in a staged fashion (portion 1 validates portion 2 before its allowed to execute and so on), and the "root" of the process is performed in hardware by the RoT engine 143.

As also depicted in FIG. 1, the baseboard management controller 130 may contain a video controller 131, which may be configured by the CPU(s) 102 of the computer system 100. The memory 164 may be shared by the video controller 131 and the general purpose processing core(s) 154, so that, in accordance with example implementations, a video controller frame buffer may be stored in the memory 164. In accordance with example implementations, the video controller 131 is coupled to a display 105.

As described herein, in accordance with example implementations, the configurator 140 operates autonomously, or independently, with respect to the general purpose processing core(s) 154 of the baseboard management controller 130 to initialize, or configure, the subsystems 150 of the baseboard management controller 130. More specifically, in accordance with example implementations, the configurator 140 operates to configure the subsystems 150 while the baseboard management controller 130 holds the general purpose processing core(s) 154 in a reset state at power up, or boot up, of the baseboard management controller 130.

Moreover, as further described herein, the baseboard management controller 130 controls switches 141 of the controller 130 to couple the configurator 140 to the subsystems 150 and isolate the general purpose processing core(s) 154 from the subsystems 150 while the configurator 140 is configuring the subsystems 150. As such, the general purpose processing core(s) 154 of the baseboard management controller 130 do not have access to the subsystems 150 until the subsystems 150 have been configured to corresponding basic levels of functionality by the configurator 140. This basic level of functionality may be beneficial for purposes of avoiding "bricking" the baseboard management controller 130 (and potentially bricking the computer system 100) without any indication as to why this occurred. For example, the subsystems 150 may be interfaces (e.g., a physical memory interface and a memory controller) that allow the display of informational and error messages to the end user via the memory 164. More specifically, in accordance with example implementations, if the baseboard management controller 130 malfunctions (e.g., a malfunction due to a hardware fault, a cryptographic key check failure, and so forth) then the CPU(s) 102 can detect the malfunction and display error messages on the display 105 using the video controller 131 inside the baseboard management controller 130 due to the memory controller and physical memory interfaces each being initialized to a basic level by the configurator 140.

As also depicted in FIG. 1, in accordance with example implementations, a programmable logic device (PLD) 160 (e.g., a complex PLD (cPLD)) may be connected to the baseboard management controller 130 and, as further described herein, may be used to communicate data representing a bit vector of data to the baseboard management controller 130 in response to the baseboard management controller 130 transitioning from a power on reset. This bit vector of data, as further described herein, may be used to control releasing the general purpose processing core(s) 154 from reset and may be used to identify groups of instructions to be executed by the configurator 140 to customize how the particular subsystems 150 are configured. Moreover, as also described herein, the PLD 160 may store data representing a "patch table," where records of the patch table may be executed by the general purpose processing core(s) 154 (after the core(s) 154 are released from reset) to further configure one or multiple subsystems 150.

Figure 2:
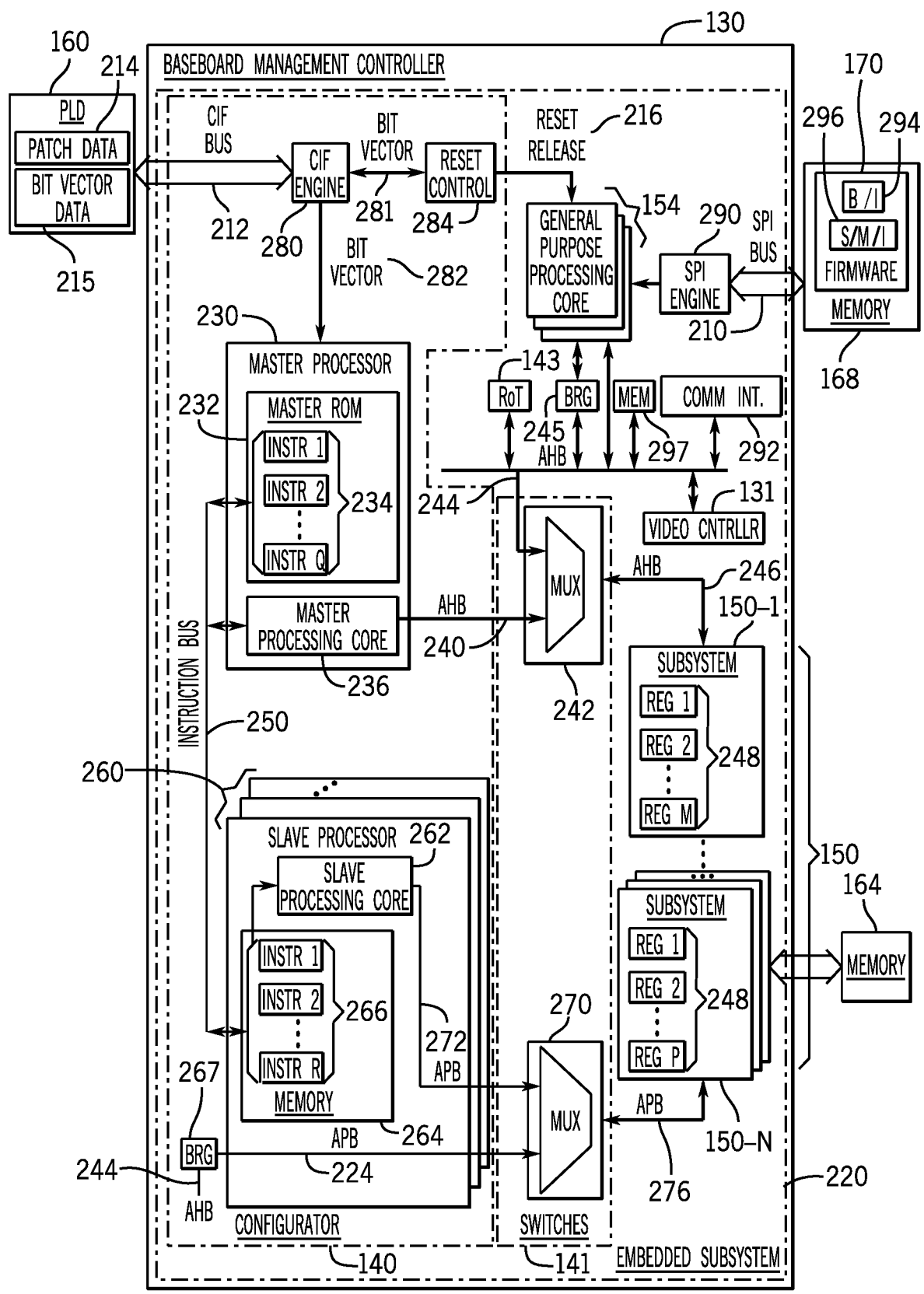
FIG. 2 is a schematic diagram of a baseboard management controller of the computer system of FIG. 1 according to an example implementation.

FIG. 2 depicts a specific example architecture for the baseboard management controller 130, although the baseboard management controller 130 may have any of a number of architectures that vary from what is shown in FIG. 2 in accordance with further implementations. For the implementation that is depicted in FIG. 2, the baseboard management controller 130 communicates with the external PLD 160 via a cPLD interface (called a "CIF bus 212" herein) using a CIF bus engine 280. The baseboard management controller 130 includes a reset control circuit 284 to control when the general purpose processing core(s) 154 are held in reset; and a serial peripheral interface (SPI) engine 290 that allows the baseboard management controller 130 to communicate with the external memory 168 that stores the firmware 170.

As depicted in FIG. 2, in accordance with example implementations, the firmware 170 includes boot instructions 294, which includes the initial portion of instructions that are loaded by the RoT engine 143 into the memory 297 and executed by the general processing core(s) 154, when released from reset. As described above, in accordance with example implementations, the general processing core(s) 154 fetch instructions in the secure memory 297 and executes the instructions to validate the next portion of the firmware 170 which may be executed from memory 168 or, upon finishing the execution of patch instructions (described further herein). may be copied and executed from the volatile memory 164.

As depicted in FIG. 2, the firmware 170 may include system management instructions 296, which are copied from the memory 168 into the memory 164 where the instructions 296 are executed by the general purpose processing core(s) 154 to perform runtime system management functions of the baseboard management controller 130, such as communicating with a remote management server; communicating with, monitoring and possibly modifying hardware components of the computer system 100; communicating with applications executing on the computer system 100; and so forth.

In accordance with example implementations, the configurator 140 includes a master processor 230 that may be specifically constructed to configure, or initialize, a specific subsystem 150 (here, subsystem 150-1, for the example depicted in FIG. 2) of N subsystems 150 of the baseboard management controller 130. This initialization may involve writing data to certain fields or sub-fields of configuration and status registers 248 of the subsystem 150-1. The master processor 230, in accordance with example implementations, includes a master processing core 236, which may be an embedded microcontroller that operates autonomously or independently with respect to the general purpose processing core(s) 154. In accordance with an example implementation, the master processing core 236 may be implemented using a Register Transfer Language (RTL) abstraction in hardware design language (HDL).

In general, the master processing core 236 may be relatively highly tailored to the specific task of configuring a specific subsystem 150, such as subsystem 150-1 as depicted in FIG. 2. The master processing core 236, in accordance with example implementations, executes instructions 234 that are stored in a non-volatile memory of the master processor 230, such as a master read only memory (ROM) 232, as depicted in FIG. 2. Storing the executable instructions 234 in a non-volatile memory that may be updated, such as the master ROM 232, as opposed to, for example, hard coding instructions for the processing core 236, allows flexibility for modifying the configuration of the subsystem 150-1 without the need for a full metal layer spin (i.e., without incurring another trip through a design, engineering fabrication cycle).

As a more specific example, in accordance with some implementations, the subsystem 150-1 may be a memory controller for the external memory 164, and another subsystem 150, such as subsystem 150-N, may be a physical memory interface for the memory 164. As an example, if a time delay between setting a parameter for the memory controller and engaging the physical memory interface is to be changed, then the master ROM 232 may be updated with relative ease and without impacting a subsequent release schedule for the baseboard management controller 130.

In accordance with further example implementations, the master processor 230 (and master processing core 236) may be used to configure a subsystem other than a memory controller. For example, in accordance with example implementations the subsystems 150 that may be configured by the configurator 140 (either via the master processor 230 or by a slave processor 260 as further described herein) may include a physical memory interface, the video controller 131, or a voltage supply. Moreover, in accordance with some implementations, a high speed serial communication interface 292 of the baseboard management controller 130 may be a subsystem 150 that is configured by the configurator 140. In this manner, the high speed serial communication interface 292 may have a physical and link layers, which may be programmed (via CSR registers) to implement any of a number of different protocols, such as PCIe and Infiniband protocols, for example. In accordance with some implementations the CPU(s) 102 may communicate with components of the baseband management controller 130, such as the video controller 131, via the communication interface 292.

As an example, in accordance with some implementations, the master ROM 232 may have a width of 84 bits and may have a depth of 128 entries, which allows 128 instructions 234 to be stored in the master ROM 232. The master ROM 232 may have other widths and entry depths, in accordance with further implementations.

As depicted in FIG. 2, in accordance with some implementations, the master processing core 236 may communicate with the subsystem 150-1 using an Advanced High-performance Bus (AHB), and the master processing core 236 may share the AHB with the general purpose processing core(s) 154 in a time-multiplexed fashion. In this manner, in accordance with example implementations, the master processing core 236 may control a switch, or multiplexer 242 (one of the switches 141), for purposes of controlling whether 1. the master processing core 236 is connected to an AHB segment 246 that is connected to the subsystem 150-1, or 2. alternatively, whether the general purpose processing core(s) 154 are connected to the AHB segment 246. More specifically, in accordance with example implementations, the master processing core 236 is coupled to an AHB segment 240, which is one input to the multiplexer 242; and the general purpose processing core(s) 154 are coupled to another AHB segment 244, which corresponds to another input of the multiplexer 242. The subsystem 150-1 is coupled to another AHB segment 246, which is coupled to an output of the multiplexer 242.

During the initial phase at power on reset in which the configurator 140 configures the subsystems 150 (and during which the general purpose processing core(s) 154 are held in reset), the master processing core 236 controls the multiplexer 242 to couple the AHB bus segments 240 and 246 together and isolate the general purpose processing core(s) 154 from the subsystem 150-1. With this multiplexer configuration, the master processing core 236 may communicate with the subsystem 150-1 for purposes of configuring the subsystem 150-1, i.e., reading and writing to control and status register 248 of the subsystem 150-1. In a similar manner, the master processing core 236 may control other multiplexers, (i.e., control other switches 141) to isolate other subsystems 150 from the general purpose processing cores 150 and allow the configuration of these other subsystems, as further described herein. When the configuration of the subsystems 150 is complete, in accordance with example implementations, the master processing core 236 may further control the multiplexers to isolate the components of the configurator 140 from the subsystems 150 and physically connect the general purpose processing core(s) 154 to the subsystem 150 so that the core(s) 154 may use the now configured subsystems 150.

Figure 3:
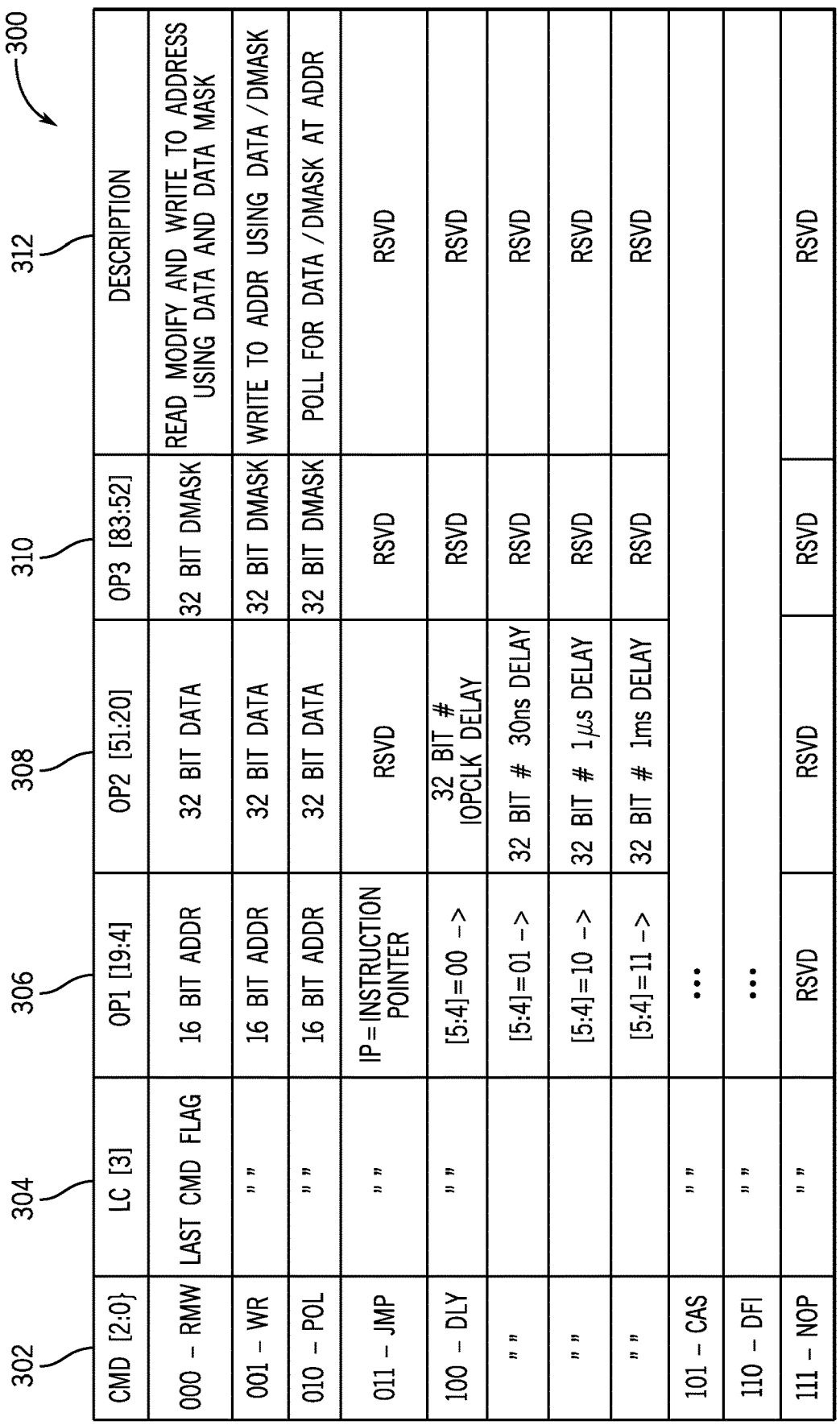
FIG. 3 is a table depicting instructions that may be executed by a master processing core of the baseboard management controller of FIG. 2 according to an example implementation.

In accordance with example implementations, the instructions 234 that are stored in the master ROM 232 may have an instruction format that is depicted in a table 300 of FIG. 3. Referring to FIG. 3, in conjunction with FIG. 2, the first three bits (CMD [2:0]) of the instruction represents a command, and example commands, along with an example bit coding corresponding to each command, are depicted in column 302 of the table 300. Referring to the column 302, "RMW" corresponds to a read-modify-write command; "POL" corresponds to a polling command; "JMP" corresponds to a jump command; "DLY" corresponds to a delay command; "NOP" corresponds to a no operation command; "CAS" corresponds to a case command of a case instruction (described further below); and "DFI" corresponds to a command for an instruction (described further below) that includes an embedded command for a slave processor 260.

Columns 306, 308 and 310 depict operands fields for the instructions in accordance with an example implementation; and column 312 contains descriptions for the read-modify-write, write, and poll instructions. For example, for the jump instruction, the sixteen bit operand field OP1[19:4] (depicted in column 306) contains bits representing a pointer to the next instruction to be executed. As another example, for the delay command, the operand field [5:4] contains bits representing a particular delay, such as a delay of a number of microseconds (i.e., [5:4]="b10," where "b" denotes a binary representation), with the number of microseconds being set by the bits in a thirty-two bit operand field OP2[51:20]. As illustrated in column 310, another thirty-two bit operand field OP3[83:52] may contain bits representing a thirty-two data mask.

In accordance with example implementations, the instruction may contain a single bit field (LC[3], depicted in column 304), which may be used (depending on the value of the bit) to bookend, or tag, a particular set of instructions that are to be executed as a group In general, the execution of the case instruction (i.e., an instruction 234 having the CAS command) causes the master processing core 236 to select, among groups of instructions that immediately follow the case instruction, a particular group of instructions 234 for execution by the core 236. More specifically, in accordance with an example implementation, the six bit operand field Op1[9:4] of the case instruction identifies a starting bit position of a bit vector 282 (see FIG. 2), and the two bit operand field Op1[11:10] of the operand field identifies a length, or number, of contiguous bit positions (beginning with the starting bit position) of the bit vector 282. Therefore, the combination of the Op1[9:4] and Op1[11:10] operand fields of the case instruction identify a contiguous set of bits of the bit vector 282. The value represented by this set of bits, in turn, is an index, or selector, that identifies the particular group of instructions that the master processing core 236 is to execute. The number of bits represented by bits in the Op1[11:10] field also indicates the number of instruction groups ($2^{length}$) that follow the case instruction. For example, if the number of bits is "3," then master processing core 236 assume that there are $2^3=8$ instruction groups that follow the case instruction; and as another example, if the number of bits is "2," then master processing core 236 assume that there are $2^2=4$ instruction groups that follow the case instruction.

The master processing core 236, in accordance with example implementations, traverses the instruction groups in walking binary order and executes the instruction group that matches the selector. The end of each instruction group may be demarcated, or bookend tagged, by the bit LC[3] bit field. Therefore, in accordance with example implementations, the number of instructions in a grouping is variable within the bounds of the size of the master ROM 232. In accordance with example implementations, the master processing core 236 continues to walk through any remaining instruction group(s) that follow the executed instruction group.

As a more specific example, an example case instruction is set forth below:

CMD[2:0]=CAS, Op1[9:4]=6'd22, Op1[11:10]=2'd2

In this notation, "6'd22" means six bits that collectively correspond to a decimal value of "22;" and "2'd2" means two bits that collectively correspond to a decimal value of "2." Therefore, for this example, bit positions 22 and 23 of the bit vector of data 282 correspond to the group instruction selector. Moreover, because the selector is formed from two bits, there are four groups of instructions that following the case instruction. The case instruction may therefore be represented in pseudocode as follows:

case (SSTRAP[23:22])
2'b00: Execute Instruction—group 1
2'b01: Execute Instruction—group 2
2'b10: Execute Instruction—group 3
2'b11: Execute Instruction—group 4

As noted above, the master ROM 232 has a depth of 128 entries, although the ROM 232 may have other depths in accordance with example implementations. The master processing core 236, in accordance with example implementations, treats the last address of the master ROM 232 (e.g., the 128th ROM address for a 128 entry implementation) as special in that the master processing core 236 after execution of any instruction at the last address halts execution and returns to an idle state upon execution of the instruction within the final ROM line. Moreover, in accordance with example implementations, the master processing core 236 may, upon reaching the last entry and before returning to the idle state, control the select input of the multiplexer 242 to decouple the master processor 230 from the subsystem 150-1 and couple the subsystem 150-1 to the AHB bus segment 245 so that the general purpose processing core(s) 154 may thereafter be connected for access to the subsystem 150-1.

Referring to FIG. 2, as further described herein, in accordance with example implementations, the configurator 140 may contain zero, one or multiple slave processors 260 (see FIG. 2), which are tailored to configuring corresponding subsystems 150 of the baseboard management controller 130. As examples, the subsystems 150 configured by the slave processors 260 may correspond to a memory physical interface, a bus controller, a voltage supply, and so forth. Moreover, a particular slave processor 260 may communicate with its subsystem 150 using a bus protocol that is different from the protocol used by any of the other slave processors 260 and/or the master processors 230. In this manner, for the example implementation that is depicted in FIG. 2, a slave processor 260 communicates with subsystem 150-N over an Advanced Peripheral Bus (APB), which may be the case, for example, when the slave processor 260 configures a physical memory interface.

The slave processors 260 communicate with the master processor 230 over an instruction bus 250. In general, the instruction bus 250 contains communication lines that may be used by the master processing core 236 to communicate a particular instruction to a particular slave processor 260 and contains decode lines that are used by the master processing core 236 to select the particular slave processor 260 so that the slave processor 260 may receive the instruction for execution. In this way, the master processing core 236 may be able to control the slave processors 260.

Referring to FIG. 3, in conjunction with FIG. 2, in accordance with example implementations, the "DFI" instruction (having the "DFI" command) is an example of an instruction that encodes within its operands an independent instruction to be executed by a particular slave processor 260 of the configurator 140. The DFI instruction may be stored in the master ROM 232 and executed by the master processing core 236 for purposes of representing an encoded instruction to be executed by a particular slave processor 260. In accordance with some implementations, the slave processor 260 may execute instructions corresponding to RMW, WR, POLL and NOP commands.

As an example, an instruction (called an "embedded instruction" herein) a slave processor 260 may be encoded into a DFI instruction as follows. The two bit Op1 [5:4] operand field contains the bits that represent the command for the embedded instruction, and other operand fields may, as appropriate, contain bits that represent the address, data and the mask of the embedded instruction. For example, for an embedded read-modify-write instruction, the Op1[5:4] operand field may contain the value "00b" (where "b" denotes a binary representation) to represent the RMW command; and other operands fields of the DFI instruction may represent a 10 bit address, 16 bits of data and a 16 bit mask for the embedded read-modify-write instruction, a last command bit field, and an operand field that contains bits that represent the specific slave processor 260 to execute the embedded read-modify-write instruction. As other examples of an DFI instruction, the Op1[5:4] operand field may contain another set of bit values representing another command (e.g., an WR write command, a POLL poll command, and an NOP no operation command); other operands fields of the DFI instruction may, as appropriate, represent operands for the embedded command, such as an address, data, mask, and so forth; and the DFI instruction may also include an operand field that contains bits that represent whether the embedded command is a last command and bit that represent the specific slave processor 260 to execute the embedded instruction.

In accordance with example implementations, the baseboard management controller 130 may contain multiple, duplicate subsystems 150 that have the same setup and configuration; and each of these duplicate subsystems 150 may be configured by a corresponding slave processor 260. For these implementations, the master processing core 236 may process a DFI instruction that contains an embedded instruction that decodes to all of these slave processors 260.

Referring back to FIG. 2, in accordance with example implementations, the slave processor 260 includes a memory 264 and a slave processing core 262 that executes instructions 266 that are stored in the memory 264 for purposes of autonomously, or independently configuring an associated subsystem 150. The memory 264, in accordance with example implementations stores instructions 266 that are communicated by the master processing core 236 to the slave processor 260, as discussed above. In accordance with some implementations, the memory 264 may be a volatile memory that does not contain any instructions other than the instructions that are communicated to the slave processor 260 via the instruction bus 250 (e.g., in response to the master processing core 236 executing a DFI instruction). In accordance with further example implementations, the memory 264 may include a non-volatile memory that is pre-encoded with certain instructions 264 to be executed by the slave processing core 262.

Similar to the master processor 230, in accordance with some implementations, the slave processing core 262 may control an associated switch 141, or multiplexer 270, which couples the slave processing core 262 to the associated sub-subsystem 150. The multiplexer 270 has one input that is connected to an APB segment 272, and other input that is connected to an APB bus segment 224 that is connected by a bridge 267 to the AHB bus segment 244. The output of the multiplexer 270 is connected to an APB segment 276 that is connected to the associated subsystem 150. The slave processing core 262 may control the multiplexer 270 for purposes of controlling whether 1. the slave processing core 262 is connected to the APB segment 276, or 2. alternatively, whether the general purpose processing core(s) 154 are connected to the APB segment 276.

In accordance with some implementations, the slave processing core 262 may have a similar design to the master processing core 236. In this regard, both processing cores 236 and 262 may be, for example, implemented using an RTL abstraction in HDL, in accordance with example implementations. In accordance with some implementations, the slave processing core 262 may have an associated instruction set that is smaller than the instruction set of the master processing core 236. For example, in accordance with some implementations, the slave processing core 262 does not execute an instruction having an embedded instruction, such as the DFI instruction. In accordance with some implementations, the slave processing core 262 may not execute a case instruction. The slave processing core 262, in accordance with example implementations may execute read-modify-write, write, read, no operation, jump and poll instructions, as well as possibly other instructions.

As depicted in FIG. 2, the PLD 160 may store bit vector of data 215 that corresponds to the bit vector of data 282 that is furnished to the master processor 230. In accordance with example implementations, in response to a power on reset of the baseboard management controller, an engine 280 of the baseboard management controller 130 communicates with the PLD 160 (via the CIF bus 212) to retrieve the bit vector of data 282. As also indicated at reference numeral 281, the engine 280 may also further data representing the bit vector of data to a reset control circuit 284 of the baseboard management controller. The reset control circuit 284, in accordance with example implementations, places the general purpose processing core(s) 154 in reset in response to the power on reset of the baseboard management controller 130, and the reset control circuit 284 holds the general purpose processing core(s) 154 in reset until certain conditions are satisfied. In accordance with example implementation, the bit vector of data 281 may establish one or multiple such conditions. As examples, the bit vector of data 281 may have one or multiple designated bit positions, which allow the configurator 140 to configure the subsystems 150 with specific conditions for allowing the general purpose processing core(s) 154 to be released from reset, such as all of the processors 230 and 260 of the configurator 140 returning to idle states, a particular amount of time elapsing, flag to be polled to indicate that the configurator's configuration of the subsystems 150 is complete, and so forth. In accordance with example implementations, the reset control circuit 284 may impose conditions for releasing the general purpose processing core(s) 154 from reset, which are independent of the actions by the configurator 140, such as, for example, conditions pertaining to determining whether there are any hardware faults, conditions pertaining to whether root-of-trust security checks have been passed, and so forth.

In accordance with example implementations, the configurator 140 configures the subsystems 150 at least to a point to bring the subsystems 150 to a basic level of functionality for simple operations. For example, in accordance with some implementations, the subsystems 150 may include a memory controller (one subsystem 150) and a physical memory interface (another subsystem 150), and the configurator 140 configures the memory controller and physical memory interface to basic levels of functionality while the general purpose processing cores 154 are held in reset. Therefore, should a particular issue arise (e.g., a hardware fault, a cryptographic check failure, and so forth) arise that prevents the general purpose processing core(s) 154 from being released from reset, the CPU(s) 102 can detect the malfunction and display error messages on the display 105 using the video controller 131 inside the baseboard management controller 130.

In accordance with example implementations, the baseboard management controller 130 allows further configuration of the subsystems 150 after the general purpose processing core(s) 154 are released from reset (and after the configuration of the subsystems 150 by the configurator 140). More specifically, in accordance with example implementations, the PLD 160 stores patch data 214, which represents a patch table that contains patch records to be executed by the general purpose processing core(s) 154 for purposes of further configuring the subsystems 150. For example, a particular patch record may contain instructions to set various quality of results (QoR) fields in a memory controller for purposes of optimizing system bus performance to the memory controller. Other relatively low level optimizations may be performed for a memory controller, as well as other subsystems, via the execution of the instructions that are contained in the patch table records. As another example, a patch record may contain a delay operation to allow for initialization routines, which include temporal elements.

In accordance with some implementations, bootstrap instructions 294, when executed by a general purpose processing core(s) 154, form a record interpreter that processes the records of the patch table and obtains information pertinent to initializing and/or patching a setting for one or multiple subsystems 150. There are many different types of operations that may be directed by the patch table records, in accordance with example implementations. The record interpreter keys off header data in the patching record for purposes of learning how many valid records exist in the patch table. In accordance with example implementations, the record interpreter is executed by the general purpose processing core(s) 154 at the beginning of the execution of the bootstrap instructions. When the record interpreter completes processing the records of the patch table, the general purpose processing core(s) 154 may then proceed to executing additional boot strap instructions 294.

Figure 4:
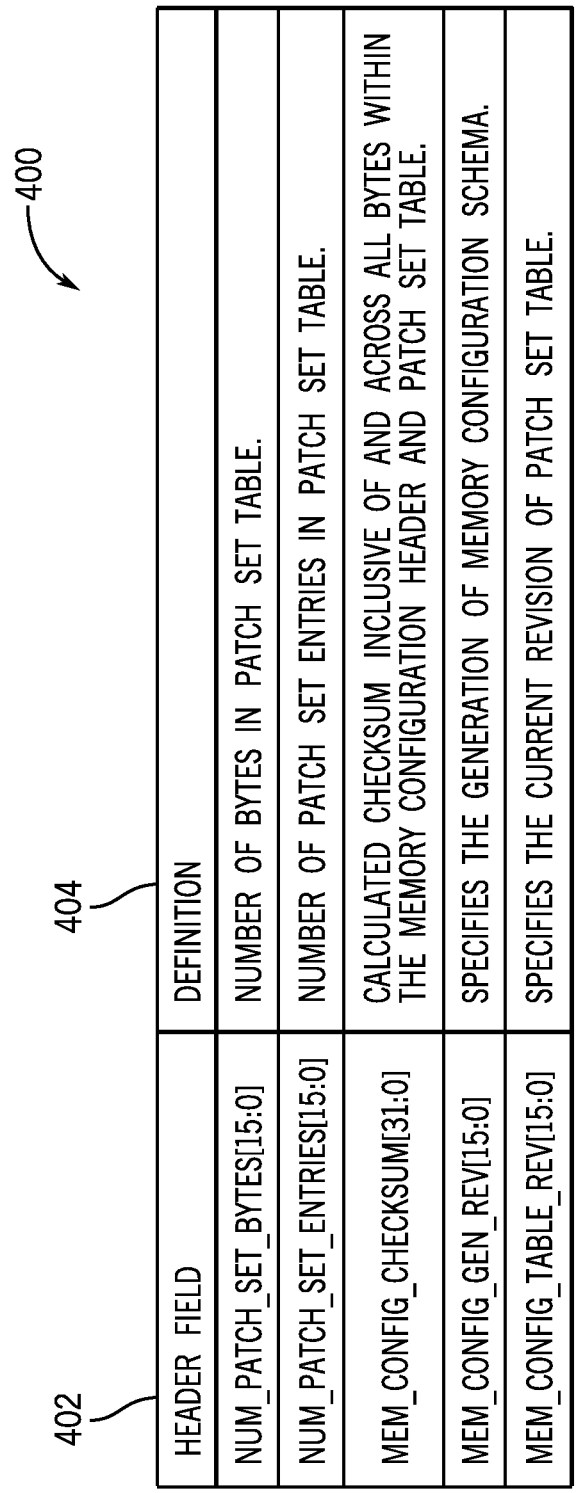
FIG. 4 is a table depicting fields of a header of a patch set table according to an example implementation.

Referring to FIG. 4, in accordance with example implementations, the patch table may contain a header, such as a header that is illustrated by a table 400 of FIG. 4. Table 400 illustrates example header fields (in column 402) and definitions (in column 404) of the header fields. As shown the header of the patch table may contain a field (NUM_PATCH_SET_BYTES[15:0]) that contains data representing the number of bytes of the patch table; a field (NUM_PATCH_SET_ENTRIES[15:0]) that contains data representing the number of entries, or records, of the patch table; a field (MEM_CONFIG_CHECKSUM[31:0]) that contains data representing a checksum of the patch table and header; a field (MEM_CONFIG_GEN_REV[15:0]) that contains data representing a schema generation; and a field (MEM_CONFIG_TABLE_REV[15:0]) that contains data representing a revision number of the patch table.

Figure 5:
FIG. 5 is a table depicting fields of a patch table record according to an example implementation.

FIG. 5 is a table 500 that represents fields (column 502) and descriptions (column 504) of a patch table entry, or record, in accordance with example implementations. As shown, the patch table record may contain a field (REG_CLASS[2:0]) defining a class of the record; a field (FIELD_START_BIT[4:0]) defining the starting bit position of the register 248 to be modified; a field (REG_OP_CODE [2:0]) defining a command (e.g., RMW, POLL, and DELAY) to be executed; a field (FIELD_BIT_LENGTH[4:0]) defining a length in bits of the field to the written or patch within the configuration register 248; a field (REG_OFFSET [15:0]) defining a register offset or delay (depending if a RMW command or DELAY command); and a field (FIELD_PATCH_DATA[31:0]) defining the data to be written or a delay (depending if a RMW command or DELAY command).

Figure 6A:
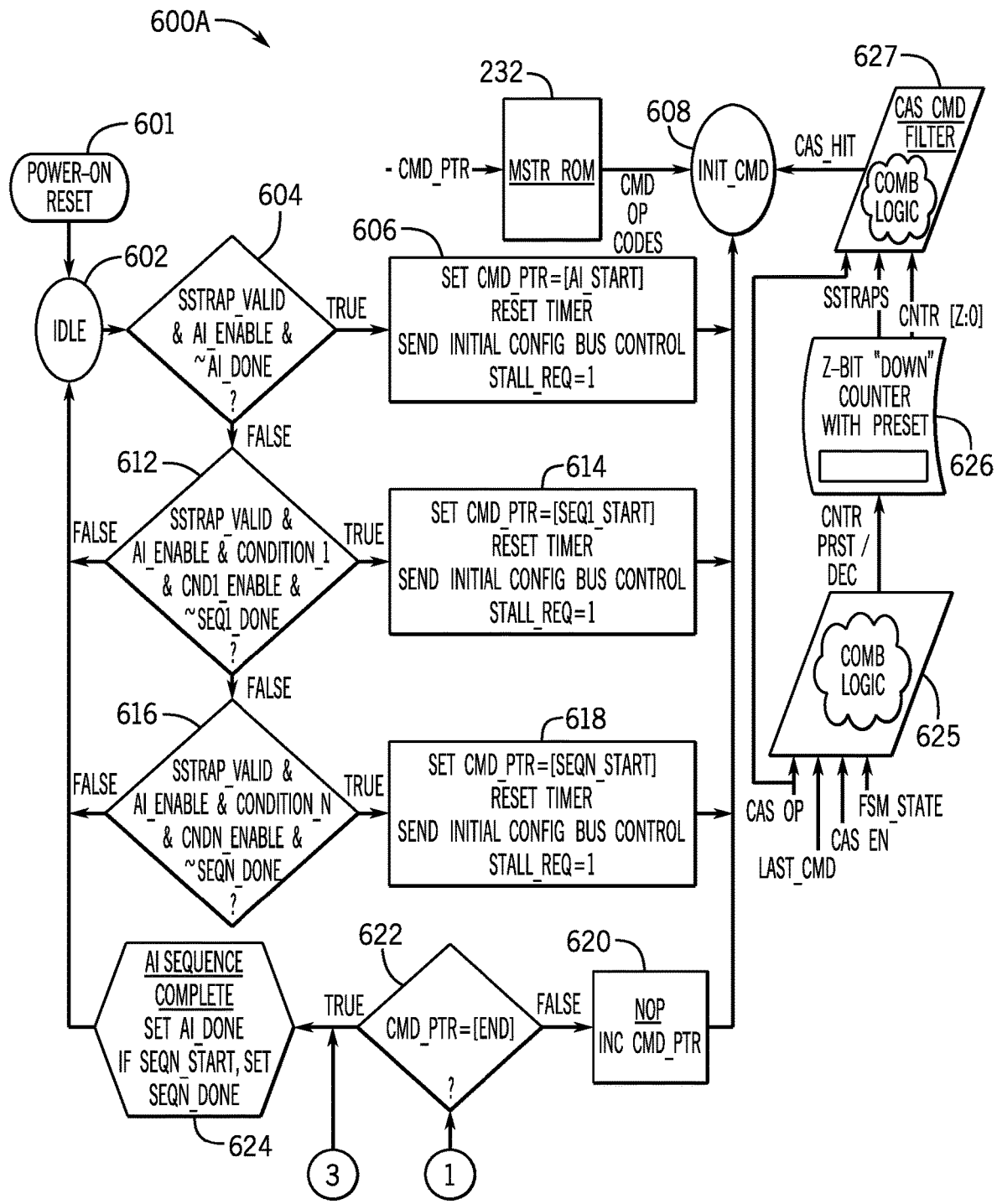
FIGS. 6A, 6B, 6C, 6D and 6E depict a state diagram of a master processing core of the baseboard management controller of FIG. 2 according to an example implementation.
Figure 6B:
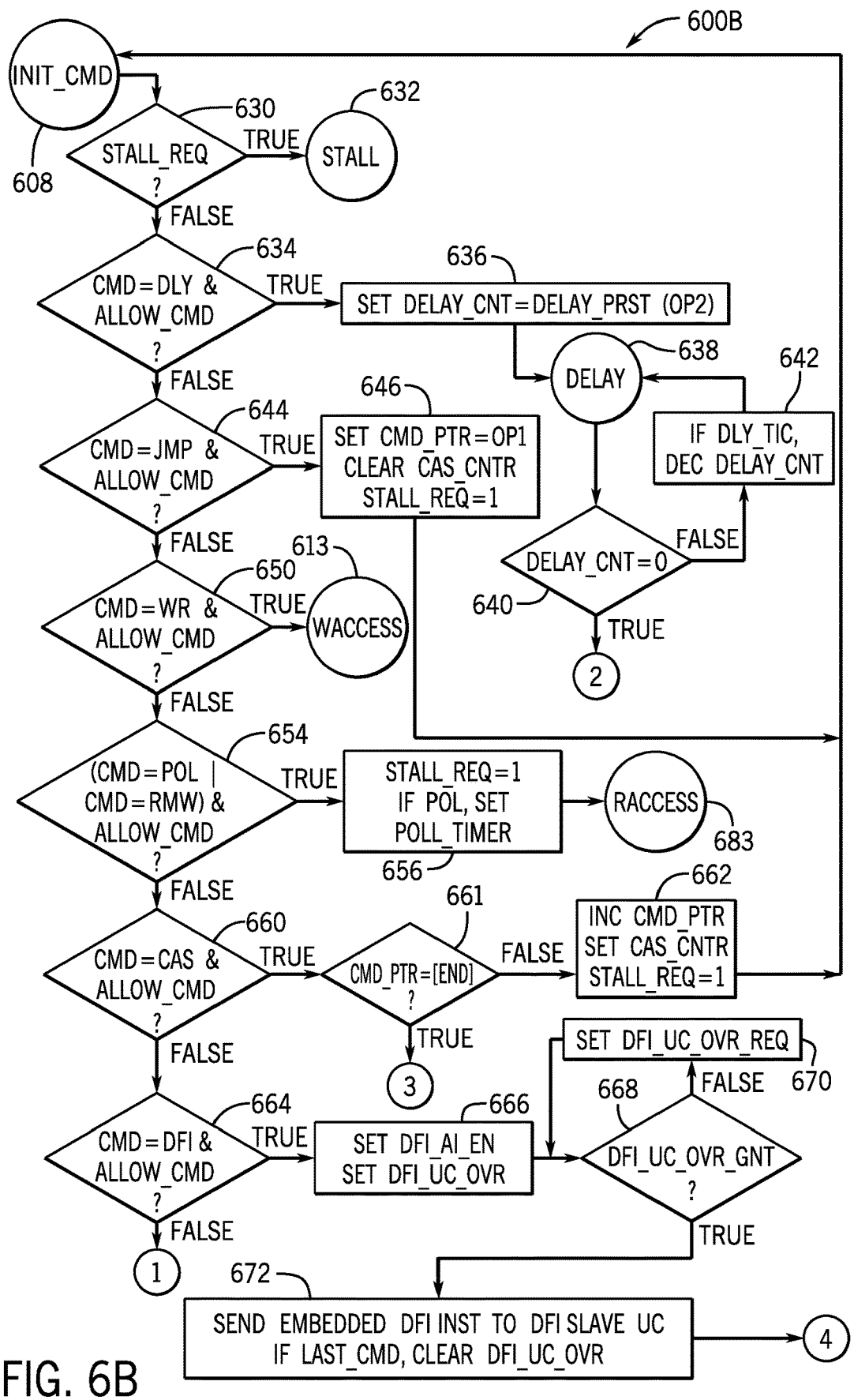
Figure 6C:
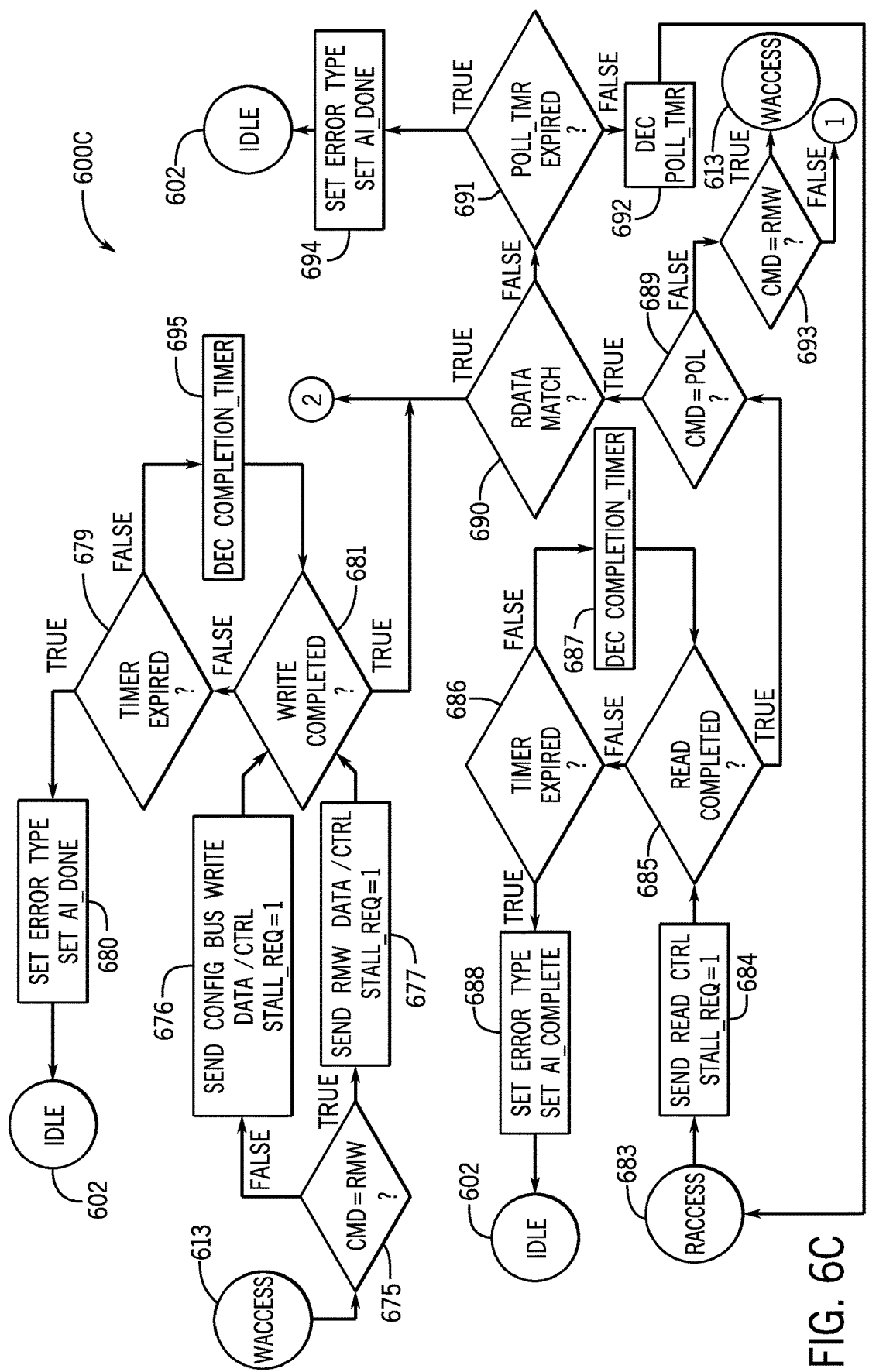

FIGS. 6A, 6B, 6C, 6D and 6E depict corresponding parts 600A, 600B, 600C and 600E, respectively of a state diagram, which illustrates the processing of instructions by the master processing core 236, in accordance with example implementations. In accordance with example implementations, the master processing core 236 has the following states: an IDLE state 602 (FIGS. 6A and 6C), which is the state in which the master processing core 236 is idle and not executing instructions; an INIT_CMD state 608 (FIGS. 6A and 6B), which is the state in which the master processing core 236 parses the commands from the instructions; a STALL state 632 (FIG. 6B); a DELAY state 638 (FIG. 6B); a WACCESS state 613 (FIGS. 6B and 6C) in which the master processing core 236 performs a write access; and an RACCESS state 683 (FIGS. 6B and 6C) in which the master processing core 236 performs a read access. In FIGS. 6A, 6B, and 6C, "AI" refers to a given subsystem's function, "CND" refers to a given conditional sequence gate; "SEQ" refers to a given group, or sequence, of instructions to be executed; "N" represents the number of operands of the sequence; "Z" represents the maximum number of contiguous bits of the bit vector of data, which are supported by the CAS command; and "SSTRAPS" represents the bit vector of data 282.

Referring to FIG. 6A, the portion 600A depicts decisions pertaining to transition to the INIT_CMD state 608 in which the master processing core 236 begins processing an instruction, including parsing the command from the instruction. In particular, FIG. 6A depicts decisions made by the master processing core 236 to transition from the IDLE state 602 to the INIT_CMD 608 state. As depicted in FIG. 6A, upon power on reset 601 of the baseboard management controller 130, the master processing core 236 transitions to the IDLE state 602. From the IDLE state 602, The master processing core 236 may transition from the IDLE state 602 to the INIT_CMD state 608 to execute either any of a number of different sequences of the instructions 234, as depicted in decision blocks 604, 612 and 616, thereby allowing flexibility in configuring the configurator 140 for the particular environment of the computer system in which the baseboard management controller 130 is incorporated. Depending on the particular sequence of instructions 234 selected via decision blocks 604, 612 and 616, the instruction pointer (CMD_PTR) is set to the appropriate value in blocks 606, 614 and 618, respectively, and control transitions to the INIT_CMD state 608.

FIG. 6A further depicts the transitioning to the INIT_CMD state 608 in response to the next instruction being selected in the master ROM 232; and transitioning to the INIT_CMD state 608 in response to a command not being recognized but the command pointer not at the end of the master ROM 232 (decision block 622). Also, as depicted by combinatorial logic 625, a count down timer 626 and a command filter 627, the master processing core 236 transitions to the INIT_CMD state in response to execution of a group of instructions that correspond to a match of the bit vector of data selector.

FIG. 6B depicts decisions made by the master processing core 236 in the INIT_CMD state based on the parsing of the command of the instruction. In particular, if the command is a stall command (as determined at decision block 630), then the master processing core 236 transitions to the STALL state 632. In accordance with example implementations, control will transfer from the STALL state 632 back to the previous state after one clock, but this is not shown in the figures for purposes of clarity. If the master processing core 236 determines (decision block 634) that the command is a delay command, then, as represented by blocks 636, 640 and 642, the master processing core 236 remains in a DELAY state 638 for a particular count before determining (decision block 697) (FIG. 6D) whether the command pointer is at the end of the master ROM 232. If not, the master processing core 236 increments (block 698) (FIG. 6D) the command pointer and returns to the INIT_CMD state 608. Otherwise, if the master processing core 236 determines (decision block 697) that the command pointer is at the end of the master ROM 232, then control returns to block 624 (FIG. 6A). If the master processing core 236 determines (decision block 644) (FIG. 6B) that the command is a JMP command, then the master processing core 236 sets (block 646) command pointer to the position represented by the operand of the instruction and returns to the INIT_CMD state 608.

If the master processing core 236 determines (decision block 650) that the command is a WR write command, then the master processing core 236 transitions to the WACCESS state 613 to perform a write access, as further described herein. If the master processing core 236 determines (decision block 654) that the command is a POLL command, or a RMW command, then the master processing core 236 sets (block 656) a poll timer flag as appropriate and transitions to the RACCESS state 683, which is further described herein.

Figure 6D:
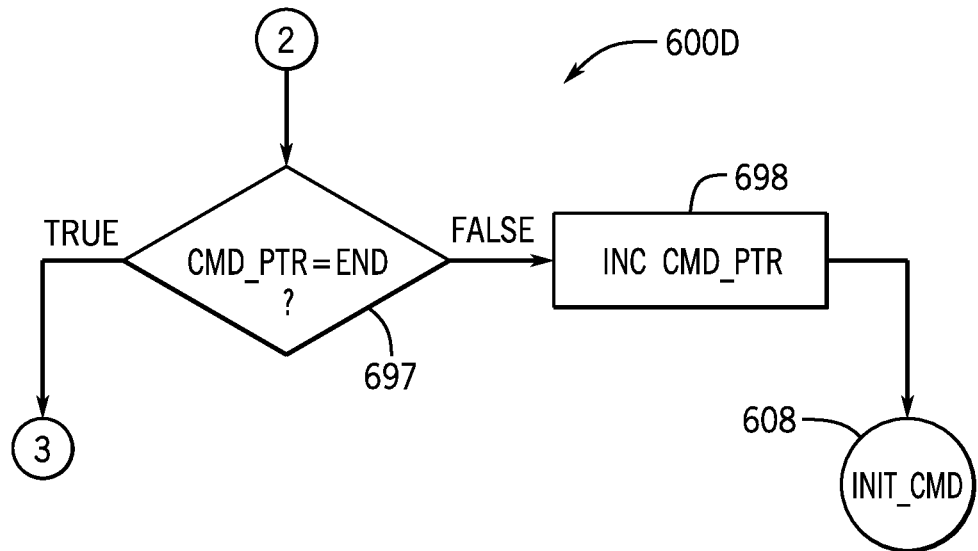
Figure 6E:
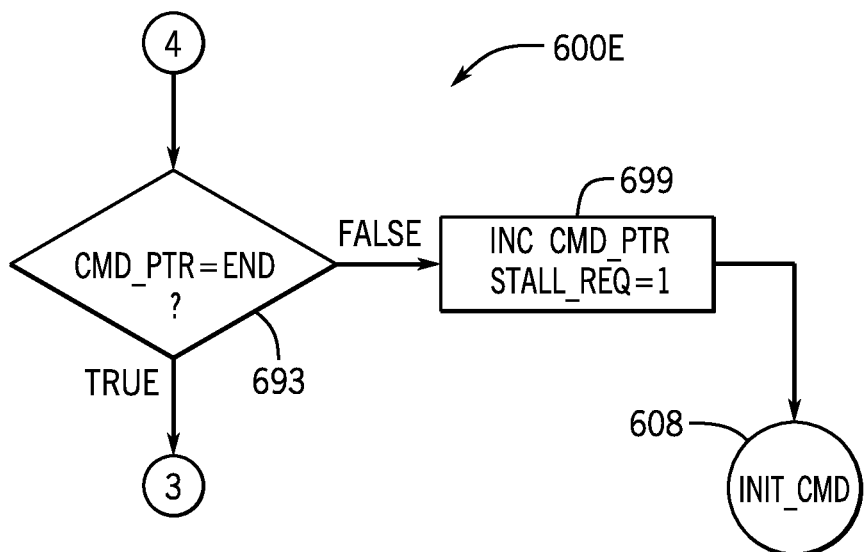

If the master processing core 236 determines (decision block 660) that the command is a CAS command, then the master processing core 236, determines (decision block 661) whether the command pointer is at the end of the master ROM 232 (i.e., in decision block 661, "[END]" refers to the final entry in the master ROM 232), and if so, control returns to block 624 (FIG. 6A). Otherwise, if the command pointer is not at the end of the master ROM 232, the master processing core 236, pursuant to block 662, increments the command pointer and sets a CAS counter flag and returns control to the INIT_CMD state 608. If the master processing core 236 determines (decision block 664) that the command is a DFI command, then the master processing core 236, pursuant to blocks 666, 668 and 670, requests the instruction bus 250 and once granted, sends the embedded instruction to the slave processor 260, pursuant to block 672. Referring to FIG. 6E, the master processing core 236 then determines (decision block 693) if the command pointer is at the end of the master ROM 232, and if not, increments the command pointer, pursuant to block 699 before returning to the INIT_CMD state 608. Otherwise, if the master processing core 236 determines (decision block 693) that the command pointer is at the end of the master ROM 232, then the master processing core 236 returns to block 624 (FIG. 6A).

FIG. 6C depicts the actions taken in the WACCESS state 613 and RACCESS state 683. In the WACCESS state 613, the master processing core 236 determines (decision block 675) whether the command is a RMW command and if so, performs (block 677) the modified data write to the specified address. Otherwise, if the master processing core 236 determines (decision block 675) that command is a WR command, the master processing core 236 writes (block 676) the specified data to the specified address. In response to the master processing core 236 determining (decision block 681) that the write has been completed, the master processing core 236 proceeds to decision block 697 (FIG. 6D). If the master processing core 236 determines (decision block 679) that the write operation is an abnormally long write (i.e., exceeds a predetermined duration as indicated by decrementing a counter, as depicted in block 695), then the master processing core 236 sets an error flag, pursuant to block 680, and returns to the IDLE state 602.

In the RACCESS state 683, the master processing core 236 performs a read request (block 684) of the specified address and determines (decision block 685) whether the read completed. In this determination, the master processing core 236 may determine (decision block 686) whether a timer as expired (per block 687) and if so set (block 688) an error flag and return to the IDLE state 602. If the master processing core 236 determines (decision block 689) that the read was associated with a POLL instruction, then the master processing core 236 determines (decision block 690) whether the read data matches the data that is part of the corresponding instruction and if so, returns to decision block 697 (FIG. 6D). Otherwise, if the read data does not match (decision block 690), the master processing core 236 waits for the duration of a timer (as represented by decision blocks 691 and 692) for subsequent reads to be executed until the POLL data matches. If the poll timer expires (as determined in decision block 691), then the master processing core 236 sets (block 694) an error flag and returns to the IDLE state 602. As also depicted in FIG. 6C, if the read was part of a read-modify-write command (as decided in decision block 693), then the master processing core 236 transitions to the WACCESS state 613 to process the write command. Otherwise, the master processing core 236 transitions back to the INIT_CMD state 308 by way of blocks 620 and 622 (as described below), if the end of the master ROM 232 has not been reached.

Referring back to FIG. 6A, if the master processing core 236 determines (decision block 622) that the command pointer is not at the end of the master ROM 232, then the master processing core 236 performs a no operation (block 620) and returns to the INIT_CMD state 608. Otherwise, if the master processing core 236 detects the end of the master ROM 232, then the master processing core 236 sets (block 624) the appropriate end of sequence flag and returns to the IDLE state 602.

In accordance with example implementations, the slave processing core 262 (see FIG. 2) may process instructions in a manner similar to the master processing core 236, except the instruction processing by the slave processing core 262 may be modified to omit certain instruction(s) that are not processed by the slave processing core 262, such as, for example, instruction containing the DFI command and/or CAS command.

Figure 7:
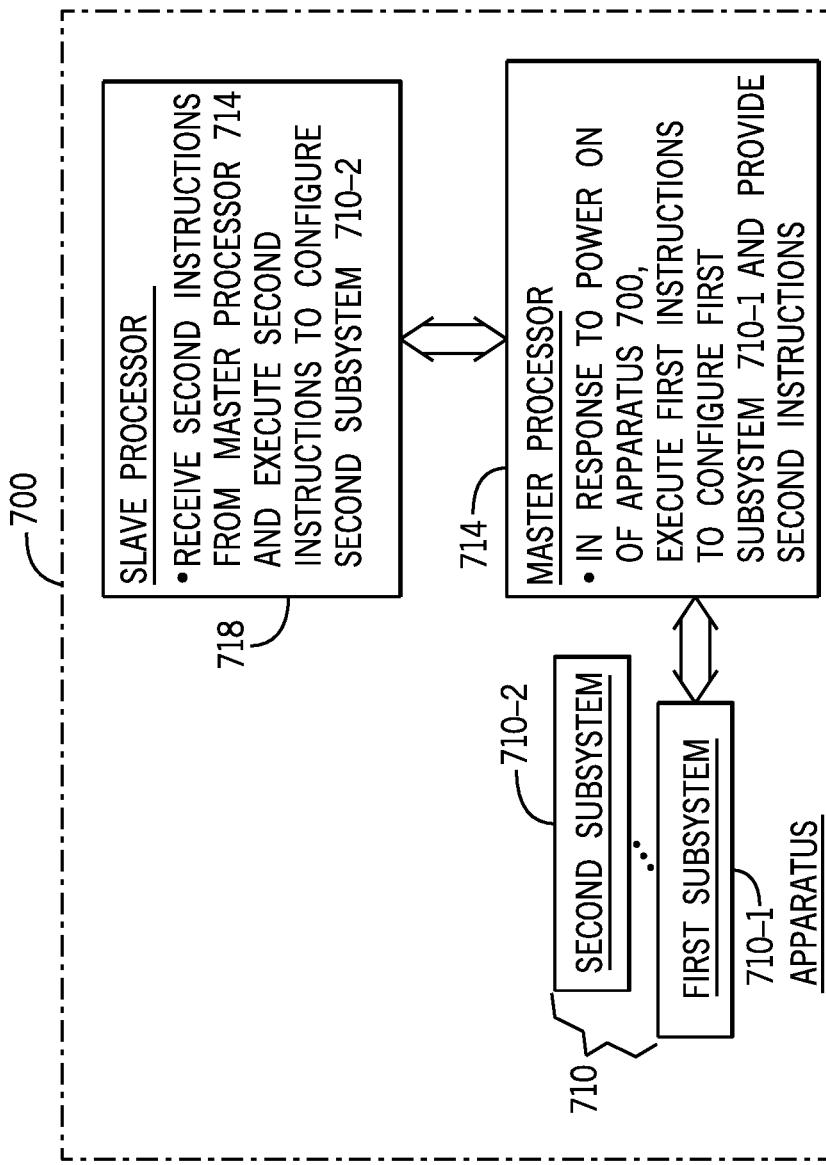
FIG. 7 is a schematic diagram of an apparatus having master and slave processors to configure subsystems of an apparatus according to an example implementation.

Referring to FIG. 7, in accordance with example implementations, an apparatus 700 includes a plurality of subsystems 710, including a first subsystem 710-1 and a second subsystem 710-2. The apparatus 700 includes a master processor 714 to, in response to a power on of the apparatus 700, execute first instructions to configure the first subsystem 710-1 and provide second instructions. The apparatus 700 further includes a slave processor 718 to, prior to the boot of the apparatus 700, receive the second instructions from the master processor 714 and execute the second instructions to configure the second subsystem 710-2.

Figure 8:
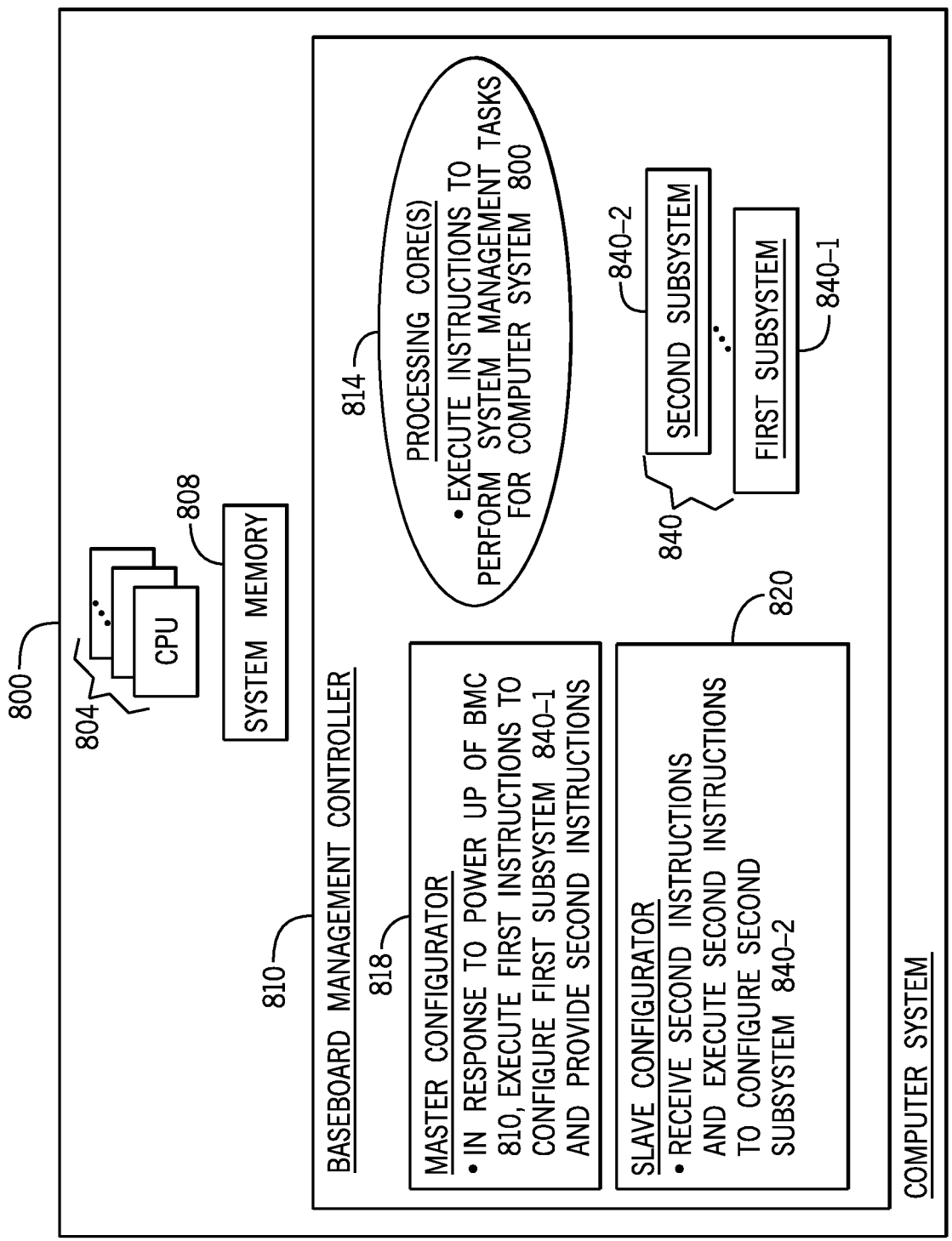
FIG. 8 is a schematic diagram of a computer system that includes a baseboard management controller having master and slave processors to configure subsystems of the computer system according to an example implementation.

Referring to FIG. 8, in accordance with example implementations, a computer system 800 includes a plurality of central processing units (CPUs) 804, a system memory 808 and a baseboard management controller 810. The baseboard management controller 810 includes a plurality of subsystems 840, including a first subsystem 840-1 and a second subsystem 840-2. At least one processing core 814 of the baseboard management controller 810 executes instructions to perform system management tasks for the computer system 800. The baseboard management controller 810 further includes a master configurator 818 and a slave configurator 820. The master configurator 818, in response to power up of the baseboard management controller 810, executes first instructions to configure the first subsystem 840-1 and provide second instructions; and the slave configurator 820 receives the second instructions and executes the second instructions to configure the second subsystem 840-2.

Figure 9:
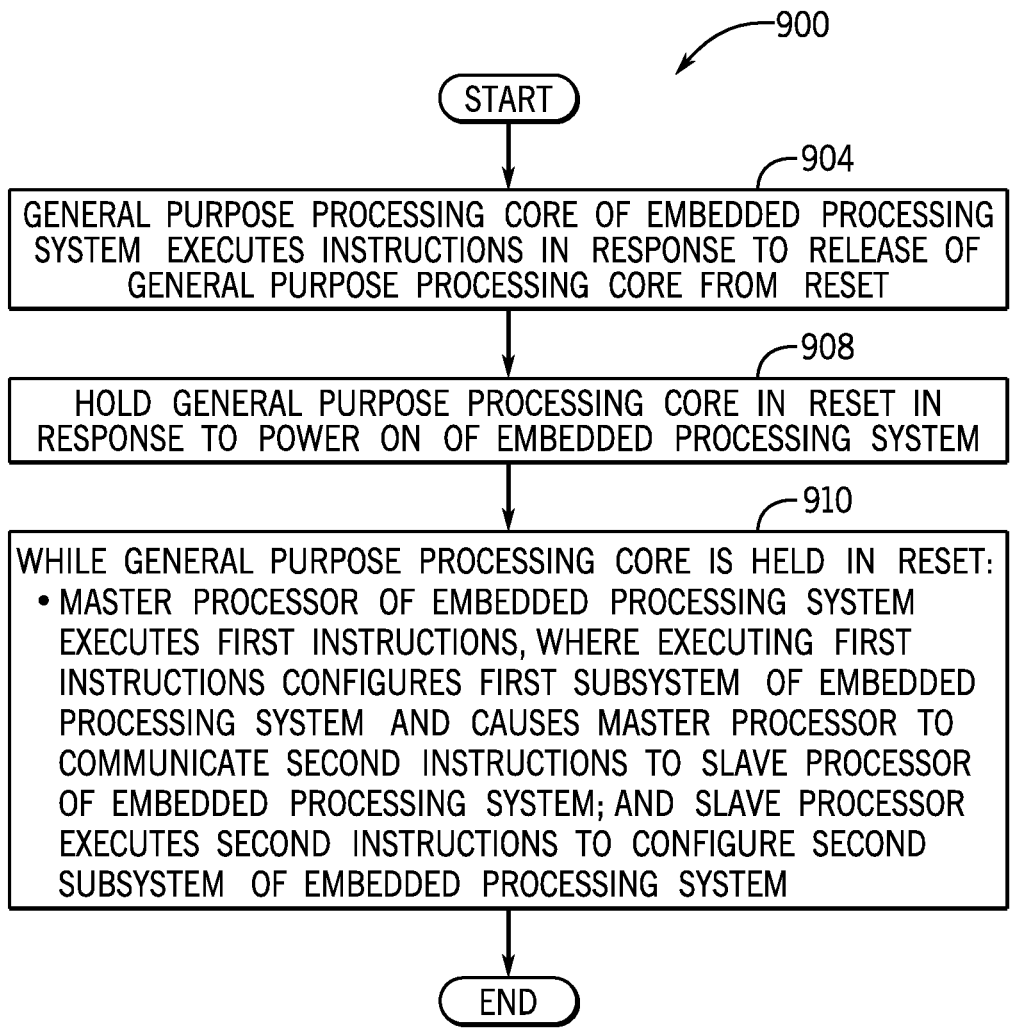
FIG. 9 is a flow diagram illustrating a process that uses master and slave processors to configure subsystems of an embedded processing system according to an example implementation.

Referring to FIG. 9, in accordance with example implementations, a technique 900 includes, pursuant to block 904, a general purpose processing core of an embedded processing system executing instructions in response to release of the general purpose processing core from reset; and holding (block 908) the general purpose processing core in reset in response to power on of the embedded processing system. The technique 900 includes, pursuant to block 910, while the general purpose processing core is held in reset, a master processor of the embedded processing system executing first instructions, where executing the first instructions configures a first subsystem of the embedded processing system and causes the master processor to communicate second instructions to a slave processor of the embedded processing system; and the slave processor executing the second instructions to configure the second subsystem.

In accordance with example implementations, the first instructions include a given first instruction having operands that represent a given second instruction of the second instructions; and the execution of the given first instruction by the master processor causes the master processor to communicate the given second instruction to the slave processor. A particular advantage of this arrangement is that a master processor is able to remotely control a slave processor that may be tailored to configure a particular subsystem.

In accordance with example implementations, the master processor communicates with the first subsystem using a first bus communication protocol, and the slave processor communicates with the second subsystem using a second bus communication protocol that is different from the first bus communication protocol. A particular advantage of this arrangement is that the master and slave processors may be specifically tailored to the particular subsystems being configured.

In accordance with example implementations, the first subsystem may include a memory controller, and the second subsystem may include a memory interface. A particular advantage of this arrangement is that basic functions for accessing a memory may be set up before general purpose processing cores are released from reset, thereby providing a way to report error messages should an issue prevent the cores from being released from the reset state.

In accordance with example implementations, the apparatus may include a bus multiplexer, and the master processor controls the bus multiplexer such that the bus multiplexer couples the master processor to the first subsystem to configure the first system and couples a general purpose processor to the first subsystem to allow the general purpose processor to communicate with the first subsystem when the general purpose processor is released from reset. A particular advantage of this arrangement is that the first subsystem may be isolated from the general purpose processor when the first subsystem is being initially configured by the master processor, thereby preventing a general purpose processor that fails a root-of-trust check from accessing the first subsystem.

In accordance with example implementations, the apparatus may store a plurality of instructions, where the plurality of instructions includes the first instructions, a case instruction and groups of instructions that are associated with the case instruction. A given group of instructions of the groups of instructions corresponds to the first instructions, and the master processor, in response to executing the case instruction, selects the first instructions for execution by the master processor based on vector of data that was received by the apparatus identifying the given group. A particular advantage of this arrangement is that flexibility is provided to allow external data to be used to control the configuration of the first subsystem by the master processor.

In accordance with example implementations, a cryptographic check failure prevents the general purpose processing core from being released from reset, and the technique further includes using at least one of the configured first subsystem and the second configured subsystem to communicate a message representing the cryptographic check failure. A particular advantage of this technique is that errors or information messages may be reported using subsystem(s) that have been configured to a basic level of functionality without relying on the general purpose processing core.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a plurality of subsystems comprising a first subsystem and a second subsystem;
a master processor to, in response to power on of the apparatus, execute first instructions to configure the first subsystem and provide second instructions; and
a slave processor to receive the second instructions from the master processor and execute the second instructions to configure the second subsystem, wherein
the first instructions comprise a given first instruction having operands representing a given second instruction of the second instructions; and
the execution of the given first instruction by the master processor causes the master processor to communicate the given second instruction to the slave processor.

2. The apparatus of claim 1, wherein the execution of the given first Instruction further causes the master processor to:
generate a decode signal to represent selection of the slave processor; and
provide the given first instruction to an instruction bus coupled to the slave processor.

3. The apparatus of claim 1, wherein the master processor communicates with the first subsystem using a first bus communication protocol, and the slave processor communicates with the second subsystem using a second bus communication protocol different from the first bus communication protocol.

4. The apparatus of claim 1, wherein the plurality of subsystems further comprises at least one additional subsystem, the apparatus further comprising:
at least one additional slave processor to, in response to the power on of the apparatus, receive and execute instructions from the master processor to configure the at least one additional subsystem.

5. The apparatus of claim 1, wherein the first subsystem comprises a memory controller, and the second subsystem comprises a memory interface.

6. The apparatus of claim 1, wherein the plurality of subsystem comprises at least one of
a memory interface, a memory controller, a bus controller or a voltage supply.

7. The apparatus of claim 1, further comprising:
a general purpose processor to execute bootstrap instructions, wherein the master processor executes the first instructions autonomously with respect to the general purpose processor, while the general purpose processor is held in reset, the slave processor executes the second instructions autonomously with respect to the general purpose processor while the general purpose processor is held in reset, and the general purpose processor executes the bootstrap instructions after being released from reset.

8. The apparatus of claim 1, further comprising:
a memory to store a plurality of instructions, wherein the plurality of instructions includes the first instructions, a case instruction and groups of instructions associated with the case instruction;
wherein:
a given group of instructions of the groups of instructions corresponds to the first instructions; and
the master processor to, in response to executing the case instruction, selects the first instructions for execution by the master processor based on a vector of data received by the apparatus identifying the given group.

9. The apparatus of claim 7, wherein:
the apparatus further comprises a root of trust storing an immutable fingerprint; and
the general purpose processor, in response to the first processor being released from reset, validates the bootstrap instructions based on the immutable fingerprint.

10. The apparatus of claim 7, further comprising a bus multiplexer, wherein the master processor:
controls the bus multiplexer to cause the bus multiplexer to couple the master processor to the first subsystem to configure the first subsystem; and
couples the general purpose processor to the first subsystem to allow the general purpose processor to communicate with the first subsystem when the general purpose processor is released from reset.

11. A computer system comprising:
a plurality of central processing units (CPUs);
a system memory; and
a baseboard management controller comprising:
a plurality of subsystems including a first subsystem and a second subsystem;
at least one processing core to execute instructions to perform system management tasks for the computer system;
a master configurator to, in response to power up of the baseboard management controller, execute instructions to configure the first subsystem and provide second instructions; and
a slave configurator to receive the second instructions and execute the second instructions to configure the second subsystem, wherein the baseboard management controller is fabricated on a monolithic semiconductor die.

12. The computer system of claim 11, wherein:
the master configurator executes a first instruction having operands that represent a given second instruction of the second instructions; and
the master configurator, in response to executing the first instruction, communicates the given second instruction to the slave configurator.

13. The computer system of claim 11, wherein:
the baseboard management controller further comprises a plurality of slave configurators, including the slave configurator that receives and executes the second instructions;
the baseboard management controller further comprises an instruction bus; and
the master configurator, in response to executing the first instruction, generates a decode signal to select the slave configurator that receives and executes the second instructions.

14. The computer system of claim 13, wherein the master configuration and the plurality of slave configurators are associated with a plurality of different bus communication protocols used to communicate data with the plurality of subsystems.

15. A method comprising:
a general purpose processing core of an embedded processing system executing instructions to boot an embedded processing system;
holding the general purpose processing core in reset, in response to a power on of the embedded processing system; and
while the general purpose processing core is held in reset:
a master processor of the embedded processing system executing first instructions, wherein executing the first instructions configures a first subsystem of the embedded processing system and causes the master processor to communicate second instructions to a slave processor of the embedded processing system; and
the slave processor executing the second instructions to configure the second subsystem.

16. The method of claim 15, wherein:
the first instructions comprise a given first instruction having operands to encode a given second instruction of the second instructions; and
executing the first instructions comprises the master processor executing the given first instruction, and the execution of the given first instruction by the master processor causes the master processor to communicate the given second instruction to the slave processor.

17. The method of claim 15, wherein a cryptographic check failure prevents the general purpose processing core from being released from reset, the method further comprising
using at least one of the configured first subsystem and the second configured subsystem to communicate a message representing the cryptographic check failure.

18. The method of claim 15, further comprising:
storing a plurality of instructions including the first instructions in a memory of the embedded processing system, wherein the plurality of instructions include the first instructions and include groups of instructions associated with the case instruction, and a given group of instructions of the groups of instructions corresponds to the first instructions; and
the master processor executing the case instruction, wherein the master processor executing the case instruction causes the master processor to select the first instructions for execution by the master processor based on vector of data received by the embedded processing system and identifying the given group.

* * * * *